United States Patent
Otsuka

(10) Patent No.: US 11,966,369 B2
(45) Date of Patent: Apr. 23, 2024

(54) FILE MANAGEMENT DEVICE AND NON-TRANSITORY COMPUTER READABLE MEDIUM

(71) Applicant: FUJIFILM BUSINESS INNOVATION CORP., Tokyo (JP)

(72) Inventor: Toru Otsuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 529 days.

(21) Appl. No.: 17/064,771

(22) Filed: Oct. 7, 2020

(65) Prior Publication Data
US 2021/0365417 A1    Nov. 25, 2021

(30) Foreign Application Priority Data

May 19, 2020    (JP) .................................. 2020-087643

(51) Int. Cl.
*G06F 16/18* (2019.01)
(52) U.S. Cl.
CPC .............................. *G06F 16/1873* (2019.01)
(58) Field of Classification Search
CPC .................................................. G06F 16/1873
USPC ........................................................ 707/695
See application file for complete search history.

(56) References Cited

U.S. PATENT DOCUMENTS

| | | | | |
|---|---|---|---|---|
| 7,685,377 B1* | 3/2010 | Milligan | ............... | G06F 3/0608 |
| | | | | 711/216 |
| 2002/0052910 A1* | 5/2002 | Bennett | .................. | G06F 9/454 |
| | | | | 718/104 |
| 2008/0154905 A1* | 6/2008 | Paalasmaa | .......... | G06F 16/9577 |
| 2008/0288301 A1* | 11/2008 | Emling | ................. | G06F 16/168 |
| | | | | 705/4 |
| 2008/0320225 A1* | 12/2008 | Panzer | .................... | H04L 67/02 |
| | | | | 711/E12.017 |
| 2010/0082535 A1* | 4/2010 | Kamal | ................... | G06Q 30/00 |
| | | | | 707/610 |
| 2011/0055721 A1* | 3/2011 | Jain | ........................ | H04N 19/46 |
| | | | | 715/810 |
| 2020/0050588 A1* | 2/2020 | Bhogal | ............... | G06F 16/1787 |

FOREIGN PATENT DOCUMENTS

JP    2011-253497 A    12/2011

\* cited by examiner

*Primary Examiner* — Cam Linh T Nguyen
(74) *Attorney, Agent, or Firm* — Oliff PLC

(57) ABSTRACT

A file management device includes a processor configured to: add specific information to a file to be managed, the specific information specifying the file to be managed which is stored in a file system, the specific information being managed in association with a storage location on the file system; and when the file downloaded to an outside of the file system is re-uploaded from an external device to the file system, acquire the specific information added to the file, and specify the storage location on the file system based on the specific information.

17 Claims, 11 Drawing Sheets

FILE MANAGEMENT DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-087643 filed May 19, 2020.

BACKGROUND

1. Technical Field

The present disclosure relates to a file management device and a non-transitory computer readable medium.

2. Related Art

In file systems, when an attempt is made to access a managed data file, a storage location of the file is specified or a search is made with attribute information such as a file name as a search key.

JP-A-2011-253497 discloses that attribute information is acquired from a document file transferred to a file storage unit, and then a corresponding document file is extracted from the file storage unit based on the attribute information.

SUMMARY

After a certain file is downloaded from the file system, it may be desired to know the storage location of the file in the file system. However, it is ineffective to make a search every time it is desired to know a storage location of a file.

Aspects of non-limiting embodiments of the present disclosure relate to efficiently specifying a storage location of a file, as compared with a case where a search is performed in order to know the storage location of the file.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a file management device including a processor configured to: add specific information to a file to be managed, the specific information specifying the file to be managed which is stored in a file system, the specific information being managed in association with a storage location on the file system; and when the file downloaded to an outside of the file system is re-uploaded from an external device to the file system, acquire the specific information added to the file, and specify the storage location on the file system based on the specific information.

BRIEF DESCRIPTION OF THE DRAWINGS

Exemplary embodiment(s) of the present disclosure will be described in detail based on the following figures, wherein.

DETAILED DESCRIPTION

Hereinafter, an exemplary embodiment of the present disclosure will be described in detail with reference to the accompanying drawings.

Overall Configuration

Figure 1:
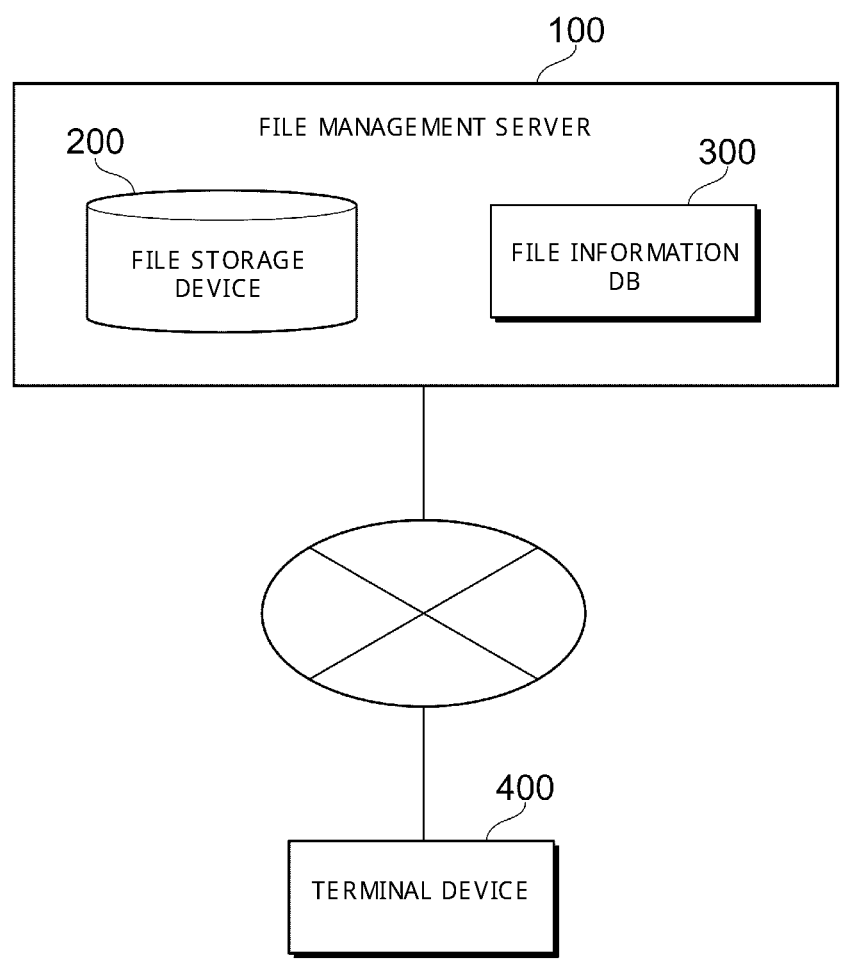
FIG. 1 is a diagram showing an overall configuration of a file management system according to an exemplary embodiment.

FIG. 1 is a diagram showing an overall configuration of a file management system according to the present exemplary embodiment. An information processing system of the present exemplary embodiment includes a file management server 100 and a terminal device 400. The file management server 100 and the terminal device 400 are connected via a network. The file management server 100 is provided with a file storage device 200 that stores data files to be managed and a file information database (DB) 300 that manages the data files. FIG. 1 shows the configuration example in which the file storage device 200 and the file information DB 300 are provided as a part of the file management server 100. Alternatively, the file storage device 200 and the file information DB 300 may be provided on the network separately from the file management server 100 to serve as a storage server and a database server, and may be accessed from the file management server 100.

The terminal device 400 accesses the file management server 100 via the network, and downloads a data file managed in the file management server 100. The terminal device 400 uploads a data file to the file management server 100, and causes the file management server 100 to manage the uploaded data file. For example, an information processing device such as a personal computer or a tablet terminal is used as the terminal device 400.

Functional Configuration of File Management Server

Figure 2:
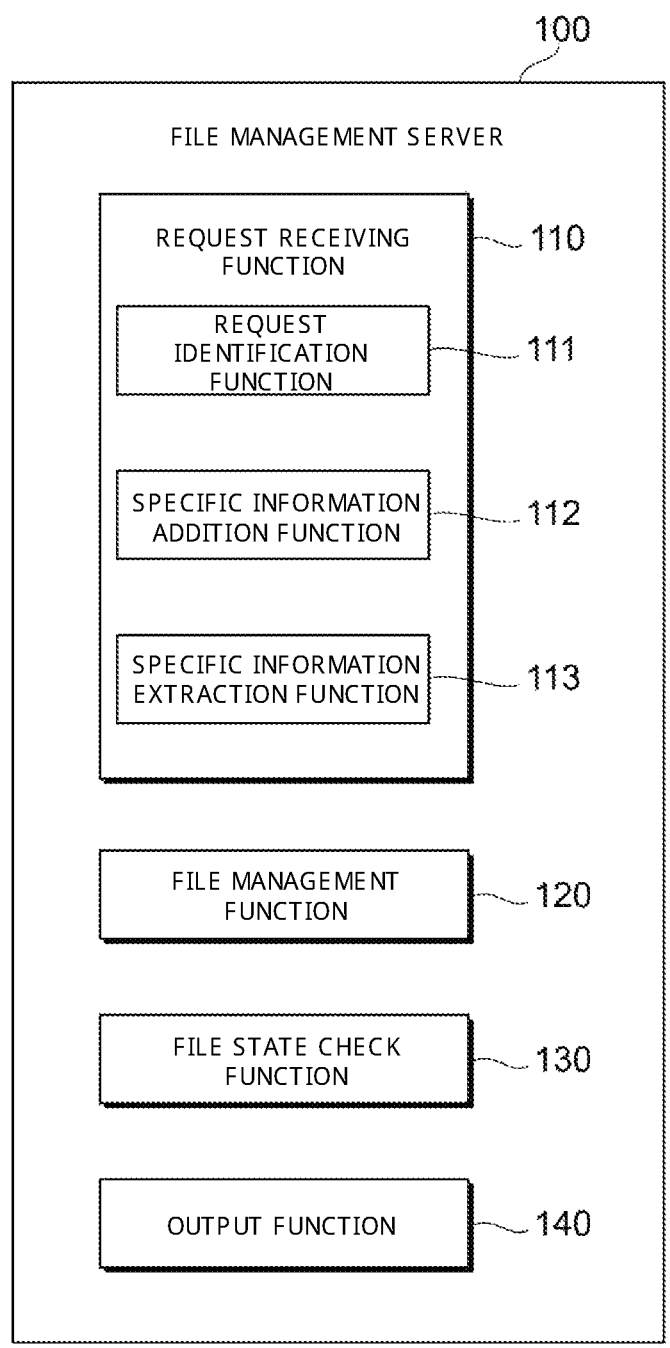
FIG. 2 is a diagram showing a functional configuration of a file management server.

FIG. 2 is a diagram showing a functional configuration of the file management server 100. The file management server 100 has a request receiving function 110, a file management function 120, a file state check function 130, and an output function 140. The request receiving function 110 includes a request identification function 111, a specific information addition function 112, and a specific information extraction function 113.

The request receiving function 110 is a function of receiving an upload request and a download request for a data file from the terminal device 400. Upon receiving the upload request for the data file by the request receiving function 110, the file management server 100 stores the data file acquired according to the upload request in the file storage device 200. Upon receiving the download request by the request receiving function 110, the file management server 100 reads the data file specified by the download request from the file storage device 200 in which the data file is stored. Then, the file management server 100 sends a copy of the data file read from the file storage device 200 to the terminal device 400 that issues the download request. At the time, the file management server 100 continues to store and manage the copy source data file (that is, the download source data file) in the storage device 200 unless the data file is deleted.

In the present exemplary embodiment, two types of upload methods are assumed for uploading the data file. One is uploading a data file to be newly managed by the file management server 100, and the other is uploading a data file that is already being managed by the file management server 100. In the following description, the former upload may be referred to as a "first upload", and the latter upload may be referred to as a "re-upload".

The request identification function 111 is a function of identifying whether an upload request received by the request receiving function 110 is a first upload request or a re-upload request. The identification of the upload request is performed based on whether specific information (which will be described later) is added to the data file to be uploaded.

The specific information addition function 112 is a function of adding the specific information to a data file to be first uploaded. The specific information is information for uniquely specifying a data file to be placed under management of the file management server 100. The specific information includes identification information (hereinafter, referred to as a "file ID") for identifying the data file. The file ID may be simply abbreviated as "ID".

The specific information may include, for example, version information of the data file (hereinafter, referred to as "version information"), location identification information indicating a location where the data file is stored, and the like. The version information is information identifying versions of plural data files to which the same file ID is added. An existence of the version information means that an update of the data file is managed based on a version. The version information is updated when a downloaded data file is re-uploaded to the same folder of the file system and updated.

The location where the data file is stored is a location in the file system in the file management server 100, and is, for example, a directory or a folder. Hereinafter, it is assumed that the location where the data file is stored is a folder, and the location identification information is referred to as a "folder ID". In a case where folders have a hierarchical structure in the file system, in addition to identification information of a folder itself in which a data file is stored, the location identification information may include information on an upper-level folder including the folder.

The pieces of above described information are examples of information used as the specific information. It is not always necessary to use all of the file ID, version information, and folder ID as the specific information. Some of the pieces of above described information may be used. Other information is not prevented from being used as the specific information. For example, information on a path in the file system in the file management server 100 may be used as the specific information.

Upon receiving the upload request for the data file by the request receiving function 110, the file management server 100 identifies whether the upload of the received data file is the first upload or the re-upload by the request identification function 111. Then, when the upload is the first upload, the file management server 100 adds the specific information to the data file to be uploaded by the specific information addition function 112. The specific information is recorded as attribute information (property) on the data file. Specifically, for example, the specific information is added to the data file in a format such as metadata recorded in a header of the data file.

The specific information extraction function 113 is a function of extracting the specific information from a data file to be re-uploaded. The data file to be re-uploaded is originally downloaded from the file system in the file management server 100. That is, the data file is already managed by the file management server 100. Therefore, when the data file is firstly uploaded, the specific information is added to the data file by the specific information addition function 112.

Upon receiving the upload request for the data file by the request receiving function 110, the file management server 100 identifies whether the upload of the received data file is the first upload or the re-upload by the request identification function 111. Then, when the upload is the re-upload, the file management server 100 extracts the specific information from the data file to be uploaded by the specific information extraction function 113.

The file management function 120 is a function of managing the uploaded data file by the file system. The file management server 100 manages the specific information of the uploaded data file in the file information DB 300 by the file management function 120. Specifically, if the data file is a first-uploaded data file, the file management function 120 registers the specific information added to the data file by the specific information addition function 112 in the file information DB 300. If the data file is a re-uploaded data file, the file management function 120 updates the file information DB 300 based on (i) the specific information extracted from the data file by the specific information extraction function 113 and (ii) a process (which will be described later) that is performed on the data file. In the file information DB 300, information on a folder structure (hierarchical structure) provided by the file system in the file management server 100 is stored. Then, the specific information of the data file is registered in association with the storage location (folder) of the data file. Details of the process performed on the data file and the update of the file information DB 300 will be described later.

The file state check function 130 is a function of checking a management state of a data file, which is a download source of the data file to be re-uploaded, in the file system in the file management server 100. The management state is checked with reference to the file information DB 300 and based on the specific information extracted from the data file to be re-uploaded. Specifically, the file management server 100 checks, by the file state check function 130, whether the management state of the data file that is the download source of the data file to be re-uploaded is the same as a management state when the data file is downloaded. Then, if the management state is different, in what manner the management state is different is investigated.

For example, the following classifications may be considered for the management states of the data file in downloading and re-uploading. Here, it is assumed that the file ID, the version information, and the folder ID are added as the specific information. It is also assumed that the folder ID includes information on the folder in which the data file is stored and information on an upper-level folder of the folder.

It is further assumed that in a case where data files having the same file ID and different versions exist, when a download request for the data file is made, the latest version of the data file is downloaded.

A. A data file corresponding to the specific information extracted from the data file to be uploaded exists.
   A-a. The data file is in an original folder from which the data file is downloaded.
      A-a-1. Version information are the same.
      A-a-2. Version information are different.
   A-b. The data file is in a folder different from an original location from which the data file is downloaded.
      A-b-1. Version information are the same.
      A-b-2. Version information are different.
B. A data file corresponding to the specific information extracted from the data file to be uploaded does not exist.
   B-a. An original folder from which the data file is downloaded exists.
   B-b. The original folder from which the data file is downloaded does not exist.
      B-b-1. A folder corresponding to the upper-level folder of the original folder exists.
      B-b-2. The folder corresponding to the upper-level folder of the original folder does not exist.

In the above classification, A-a-1 is a case where the data file to be uploaded is in the same management state as a management state at a time when the data file is downloaded in the file system in the file management server 100.

A-a-2 means that a data file of a newer version than the version of the data file to be uploaded exists in the file system. This indicates that, after one user downloads a data file and before he or she re-uploads the data file, another user downloaded the same data file and re-uploaded the same data file to update the version information.

A-b-1 means that, in a period after the data file to be uploaded is downloaded and before the data file to be uploaded is re-uploaded, the data file to be uploaded is moved from a folder in which the data file to be uploaded is stored when being downloaded to another folder. A-b-2 indicates that, together with the moving of the data file, the data file is updated by another user, and the version information is also updated.

In a case where the file system in the file management server 100 does not manage the versions of the data files and the version information is not included in the specific information, classifications corresponding to the classification A are only A-a and A-b, and none of the classifications of A-a-1, A-a-2, A-b-1, and A-b-2 exists. In this case, A-a indicates that the data file to be uploaded is in the same management state as a management state at a time when the data file is downloaded. Then, A-b indicates that, in a period after the data file to be uploaded is downloaded and before the data file to be uploaded is re-uploaded, the data file to be uploaded is moved from a folder in which the data file be uploaded is stored when being downloaded to another folder.

In a case where the specific information does not include the folder ID, there is no difference between A-a and A-b, and the classification A is classified into two cases, that is, (i) a case where the version information are the same (A-a-1, A-b-1) and (ii) a case where the version information are different (A-a-2, A-b-2).

The classification B means that the data file to be uploaded has been deleted from the file system after being downloaded. B-a is a case where only the data file is deleted. B-b is a case where a whole folder in which the data file is stored is deleted. B-b-1 is a case where only the folder in which the data file is stored is deleted. B-b-2 is a case where the upper-level folder of the folder in which the data file is stored is also deleted. Here, the upper-level folder may be a folder which is one level above the folder in which the data file is stored, or may be one or more folders specified by tracing back plural layers. In a case where information on the upper-level folder is not included in the specific information, none of the classifications of B-b-1 and B-b-2 exists.

The output function 140 is a function of outputting an output corresponding to an inspection result obtained by the file state check function 130. The file management server 100 provides the user with information on the management state of the data file to be uploaded in the file system by the output function 140. The information is provided by, for example, generating an image including information to be provided to the user and transmitting the image to the terminal device 400, and displaying the image on the terminal device 400.

Hardware Configuration of File Management Server

Figure 3:
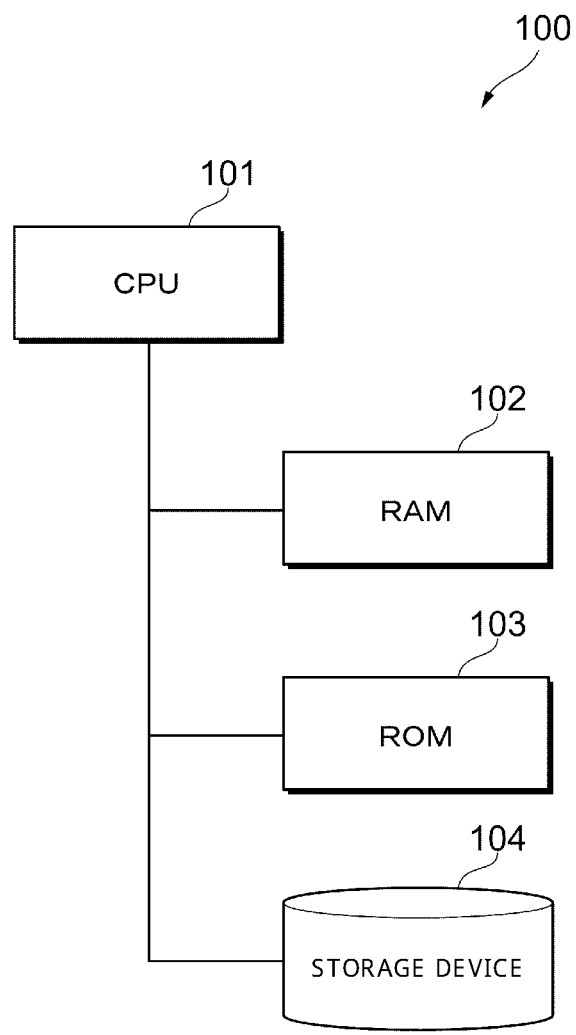
FIG. 3 is a diagram showing an example of a hardware configuration of the file management server.

FIG. 3 is a diagram showing an example of a hardware configuration of the file management server 100. The file management server 100 is implemented by a computer. A computer that implements the file management server 100 includes a central processing unit (CPU) 101 that is an arithmetic unit, and a random access memory (RAM) 102, a read only memory (ROM) 103, and a storage device 104 that serve as storages. The RAM 102 is a main storage device (main memory), and is used as a working memory when the CPU 101 performs arithmetic processing. Programs and data such as setting values prepared in advance are stored in the ROM 103. The CPU 101 reads the programs and the data directly from the ROM 103 to execute the processing. The storage device 104 is a storage that stores the programs and the data. The program is stored in the storage device 104. The CPU 101 reads a program stored in the storage device 104 into the RAM 102, which is the main storage device, and executes the program. A result of the processing by the CPU 101 is stored in the storage device 104. For example, a magnetic disk device, a solid state drive (SSD), or the like is used as the storage device 104.

When the file management server 100 is implemented by the computer shown in FIG. 3, the functions described with reference to FIG. 2 is implemented by the CPU 101 executing the programs. In the case where the file storage device 200 and the file information DB 300 are provided in the file management server 100 as shown in FIG. 1, the file storage device 200 and the file information DB 300 are implemented by the storage device 104.

Operation Example of File Management Server

Hereinafter, an operation of the file management server 100 will be described with reference to flowcharts in FIGS. 4 to 8. First, an operation for the upload request will be described. Then, plural examples will be given on the specific information, and the operation in re-uploading in each case will be described with reference to separate flowcharts, respectively. The operation when the download request is received is merely an operation of reading the data file specified by the download request from the file storage device 200 and sending the read data file to the terminal device 400. Therefore, a description with reference to a flowchart will be omitted.

Operation Example in Receiving Upload Request

Figure 4:
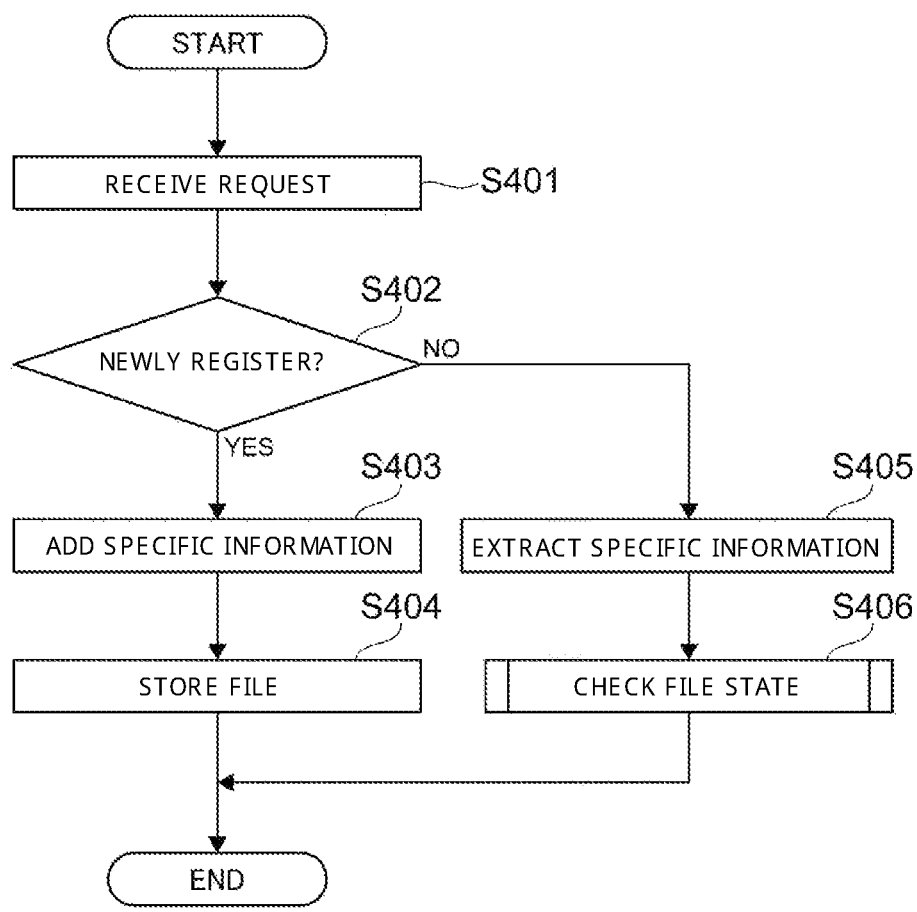
FIG. 4 is a flowchart showing an operation when the file management server receives an upload request.

FIG. 4 is a flowchart showing an operation when the file management server 100 receives the upload request. Upon receiving the upload request from the terminal device 400 (S401), the file management server 100 identifies whether an upload according to the request is a first upload or a re-upload by the request identification function 111. When the upload is the first upload (YES in S402), the file management server 100 adds, by the specific information addition function 112, the specific information to the data file to be uploaded (S403), and stores the data file in the file storage device 200 (S404). The specific information added to the data file is registered in the file information DB 300.

On the other hand, when the upload according to the upload request in S401 is the re-upload (NO in S402), the file management server 100 extracts the specific information from the data file to be uploaded by the specific information extraction function 113 (S405). Then, the file management server 100 checks the management state of the data file based on the extracted specific information by the file state check function 130 (S406). Operations described below with reference to FIGS. 5 to 8 are details of the operation shown in S406.

First Operation Example in Re-Uploading

Figure 5:
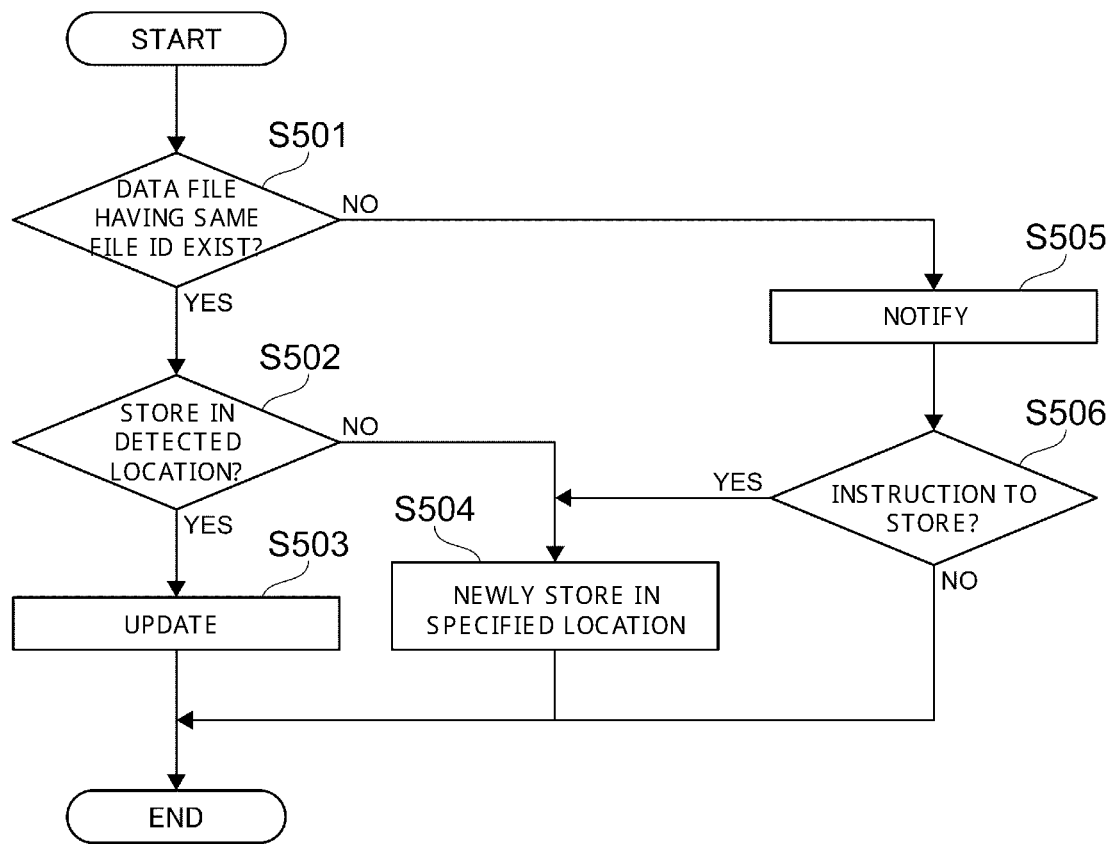
FIG. 5 is a flowchart showing an example of an operation of the file management server in re-uploading.

FIG. 5 is a flowchart showing an example of an operation of the file management server 100 in re-uploading. The operation shown in FIG. 5 is an operation in a case where the specific information of the data file simply includes the file ID. The file management server 100 refers to the file information DB 300, and firstly, checks whether a data file having the same file ID as the file ID indicated by the specific information extracted from the data file to be uploaded exists in the file system. When the data file having the same file ID exists (YES in S501), the file management server 100 queries whether the data file to be uploaded is stored in the location (folder) where the relevant data file is detected, and waits for an instruction from the user. The output function 140 implements the querying for the user and the receiving of the instruction from the user, for example, through a user interface (UI) screen displayed on the terminal device 400 of the user.

In the example shown in FIG. 5, the folder ID is not included in the specific information. It is not clear only from the specific information whether the folder in which the data file is detected is the same folder from which the data file is downloaded. However, the specific information and the folder in which the data file is stored are associated with each other in the file information DB 300. If information on the downloading is recorded in the file information DB 300, it can be determined whether the folder in which the data file is detected is the same folder from which the data file is downloaded.

When receiving an instruction to store the data file to be uploaded in the folder in which the data file is detected (YES in S502), the file management server 100 stores the data file in accordance with the instruction. In this case, since the data file having the same file ID exists in the folder, the data file is updated (S503). On the other hand, when receiving an instruction to store the data file to be uploaded in a folder that is different from the folder in which the data file is detected (NO in S502), the file management server 100 stores the data file in the folder specified by the instruction. In this case, the data file to be uploaded is stored as a new data file (S504).

When there is no data file having the same file ID as that of the data file to be uploaded in the file system (NO in S501), the file management server 100 notifies the user of the fact (S505). This means that the relevant data file has been deleted from the file system. Then, when receiving an instruction to store the data file in one of folders (YES in S506), the file management server 100 stores the data file in the folder specified by the instruction. In this case, the data file to be uploaded is stored as a new data file (S504).

On the other hand, when receiving an instruction to cancel the re-uploading of the data file (NO in S506), the file management server 100 ends the process. The output function 140 implements the notifying to the user and the receiving of the instruction from the user, for example, through the UI screen displayed on the terminal device 400 of the user.

Second Operation Example in Re-Uploading

Figure 6:
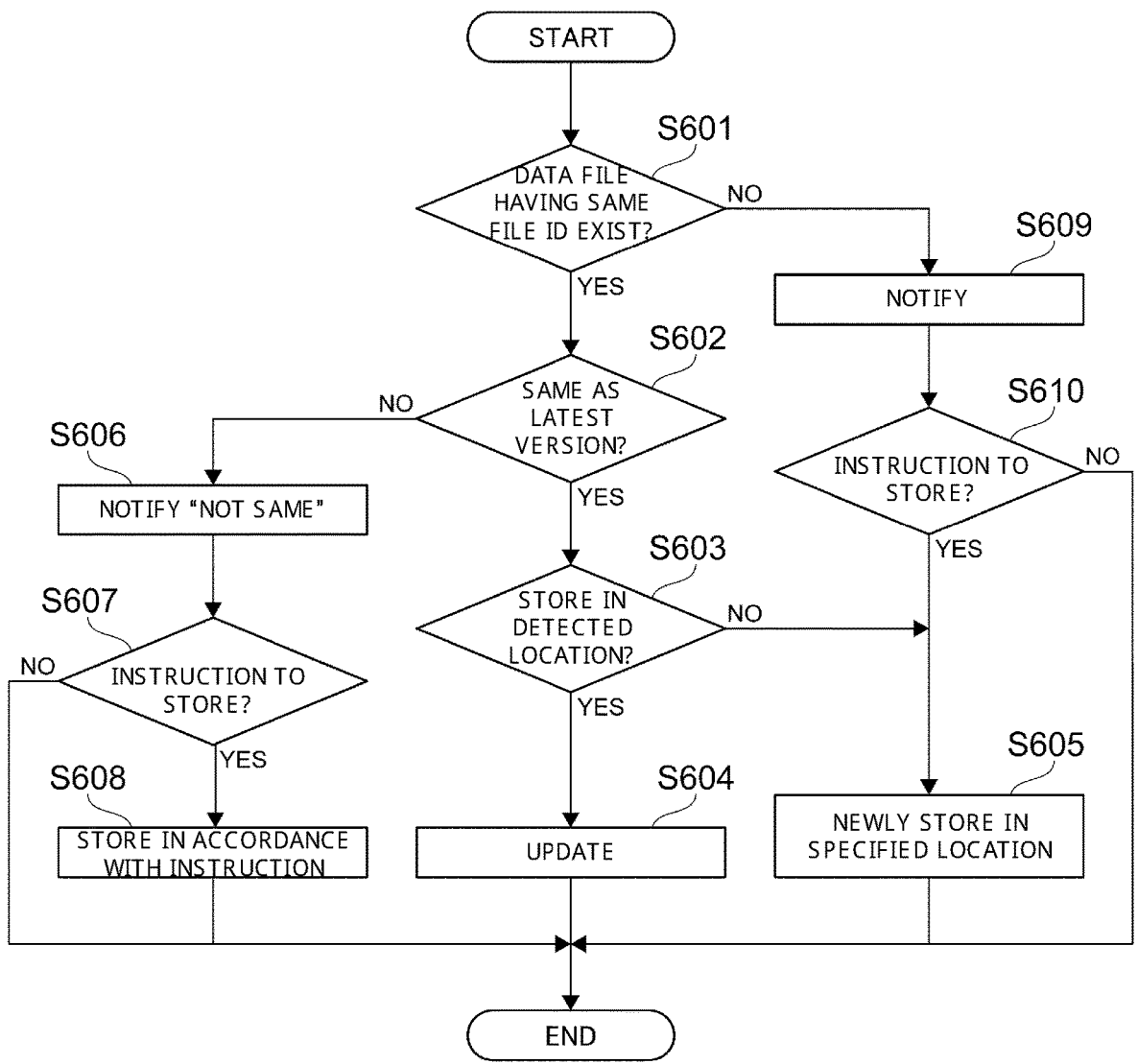
FIG. 6 is a flowchart showing another example of the operation of the file management server in re-uploading.

FIG. 6 is a flowchart showing another example of an operation of the file management server 100 in re-uploading. The operation shown in FIG. 6 is an operation in a case where the specific information of the data file includes the file ID and the version information. The file management server 100 refers to the file information DB 300, and firstly, checks whether a data file having the same file ID as the file ID indicated by the specific information extracted from the data file to be uploaded exists in the file system. In the operation example, the version information is included in the specific information, and the version of the data file is managed. Therefore, there is a possibility that plural data files having the same file ID exist.

When a data file(s) having the same file ID exist (YES in S601), the file management server 100 compares the latest version information among the detected data file(s) with the version information of the data file to be uploaded. When the version information of the data file to be uploaded is the same as the latest version among the detected data file(s) (YES in S602), the file management server 100 queries whether the data file to be uploaded is stored in a location (folder) where the relevant data file is detected, and waits for an instruction from the user. In the example shown in FIG. 6, the folder ID is not included in the specific information. However, whether the folder in which the data file is detected is the same as the folder from which the data file is downloaded can also be determined based on information on the file information DB 300 as in the example shown in FIG. 5.

When receiving an instruction to store the data file to be uploaded in the folder in which the data file is detected (YES in S603), the file management server 100 stores the data file in accordance with the instruction. In this case, since the data file having the same file ID exists in the folder, the data file is updated (S604). Here, the data file to be uploaded is additionally stored in the folder in which the data file is detected, and the version information of the additionally stored data file is updated to the latest version.

On the other hand, when receiving an instruction to store the data file to be uploaded in a folder that is different from the folder in which the data file is detected (NO in S603), the file management server 100 stores the data file in the folder specified by the instruction. In this case, the data file to be uploaded is stored as a new data file (S605). Therefore, the version information of the data file to be uploaded becomes the first version regardless of a previous version(s).

When the version information of the data file to be uploaded is not the same as the latest version among the detected data file(s) (NO in S602), the file management server 100 notifies the user that the version information of the data file to be uploaded is not the latest version (described as "not same" in the figure) (S606). Then, when receiving an instruction to store the data file in one of folders (YES in S607), the file management server 100 stores the data file in the folder specified by the instruction (S608). On the other hand, when receiving an instruction to cancel the re-uploading of the data file (NO in S607), the file management server 100 ends the process.

Here, the case where the version information of the data file to be uploaded is not the latest version refers to a case where there is a data file of a newer version than the version of the data file to be uploaded in the folder in which the data file is detected. This means that after the data file to be uploaded is downloaded, another user downloads the same data file and re-uploads the data file to update the version information as described in the classification A-a-2 of the management state of the data file. At this time, the user may select any one of (1) storing the data file to be uploaded in the same folder as the latest version of the same data file and (2) newly storing the data file to be uploaded as another data file. In the case of (2) (newly storing), the user may further select any one of (i) storing the data file to be uploaded in the same folder and (ii) storing the data file to be uploaded in a different folder. When re-uploading a data file, the user selects one of these storage methods and issues an instruction.

When no data file having the same file ID as that of the data file to be uploaded exists in the file system (NO in S601), the file management server 100 notifies the user of the fact (S609). Then, when receiving an instruction to store the data file in one of folders (YES in S610), the file management server 100 stores the data file in the folder specified by the instruction (S605). In this case, the data file to be uploaded is stored as a new data file. On the other hand, when receiving an instruction to cancel the re-uploading of the data file (NO in S610), the file management server 100 ends the process.

Third Operation Example in Re-Uploading

Figure 7:
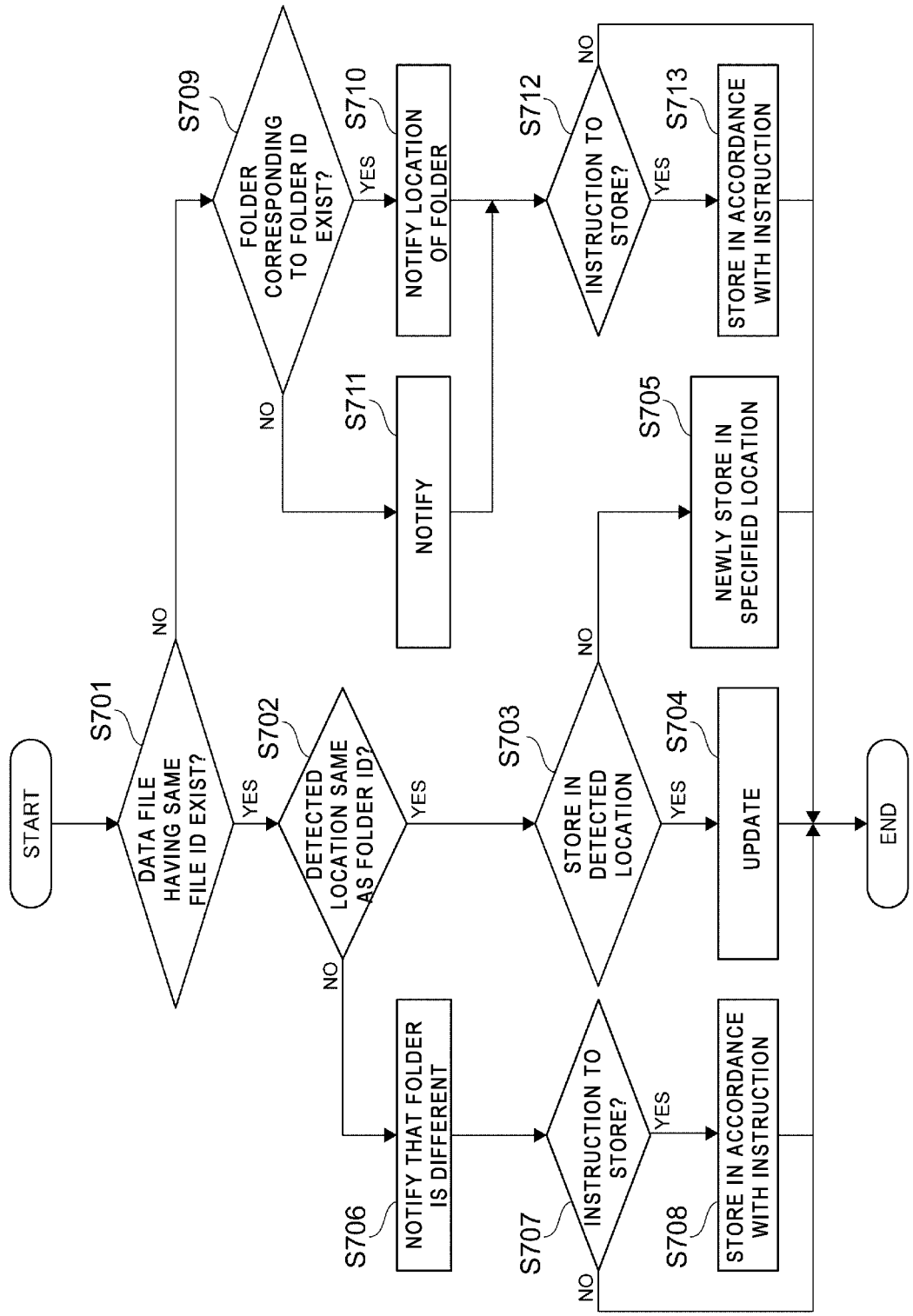
FIG. 7 is a flowchart showing further another example of the operation of the file management server in re-uploading.

FIG. 7 is a flowchart showing further another example of the operation of the file management server 100 in re-uploading. The operation shown in FIG. 7 is an operation in a case where the specific information of the data file includes the file ID and the folder ID. In the example, it is assumed that the specific information of the data file includes the folder ID of the folder in which the data file is stored, but does not include information on an upper-level folder. The file management server 100 refers to the file information DB 300, and firstly, checks whether a data file having the same file ID as the file ID indicated by the specific information extracted from the data file to be uploaded exists in the file system.

When the data file having the same file ID exists (YES in S701), the file management server 100 checks whether the location (folder) in which the data file is detected matches the folder indicated by the folder ID of the data file to be uploaded. When the folders match each other (YES in S702), the file management server 100 queries whether the data file to be uploaded is stored in the folder in which the data file is detected, and waits for an instruction from the user.

When receiving an instruction to store the data file to be uploaded in the folder in which the data file is detected (YES in S703), the file management server 100 stores the data file in accordance with the instruction. In this case, since the data file having the same file ID exists in the folder, this data file is updated (S704). On the other hand, when receiving an instruction to store the data file to be uploaded in a folder that is different from the folder in which the data file is detected (NO in S703), the file management server 100 stores the data file in the folder specified by the instruction. In this case, the data file to be uploaded is stored as a new data file (S705).

When the folder in which the data file is detected does not match the folder indicated by the folder ID of the data file to be uploaded (NO in S702), the file management server 100 notifies the user that the detected folder is different from the folder indicated by the folder ID (S706). Then, when receiving an instruction to store the data file in one of folders (YES in S707), the file management server 100 stores the data file in the folder specified by the instruction (S708). On the other hand, when receiving an instruction to cancel the re-uploading of the data file (NO in S707), the file management server 100 ends the process.

Here, the case where the folder in which the data file is detected does not match the folder indicated by the folder ID of the data file to be uploaded refers to a case where the data file having the same file ID as that of the data file to be uploaded is in a folder different from the folder indicated by the folder ID. This means that after the data file to be uploaded is downloaded, the corresponding data file has been moved to another folder as described in the classification A-b-1 of the management state of the data file. At this time, the user may select any one of (1) storing the data file to be uploaded (that is, updating the data file) in the detected folder (that is, the move destination) and (2) newly storing the data file to be uploaded in a folder other than the detected folder. In the case of (2), the user may select any one of (i) storing the data file to be uploaded in the (move source) folder of the download source and (ii) storing the data file to be uploaded in another folder that is neither the move destination nor the move source. When re-uploading a data file, the user selects one of these storage methods and issues an instruction.

When no data file having the same file ID as the data file to be uploaded exists in the file system (NO in S701), the file management server 100 checks whether the folder having the same folder ID as the folder ID included in the specific information of the data file to be uploaded exists in the file system (S709). When a folder corresponding to the folder ID of the data file to be uploaded exists (YES in S709), the file management server 100 notifies the user of the location of the detected folder in the file system (S710), and waits for an instruction.

When no folder corresponding to the folder ID of the data file to be uploaded exists (NO in S709), the user is notified of the fact (S711). Then, when receiving an instruction to store the data file in one of folders (YES in S712), the file management server 100 stores the data file in the folder specified by the instruction (S713). In this case, the data file to be uploaded is stored as a new data file. On the other hand, when receiving an instruction to cancel the re-uploading of the data file (NO in S712), the file management server 100 ends the process.

In the example shown in FIG. 7, the specific information simply includes the folder ID of the folder in which the data file is stored. Therefore, when no corresponding folder exists, an instruction from the user is waited for. In a case where the specific information includes information on the upper-level folder of the folder in which the data file is stored, the file management server 100 queries the user as to whether to detect the upper-level folder by tracing back the folder structure of the file system based on the specific information and store the data file.

Fourth Operation Example in Re-Uploading

Figure 8:
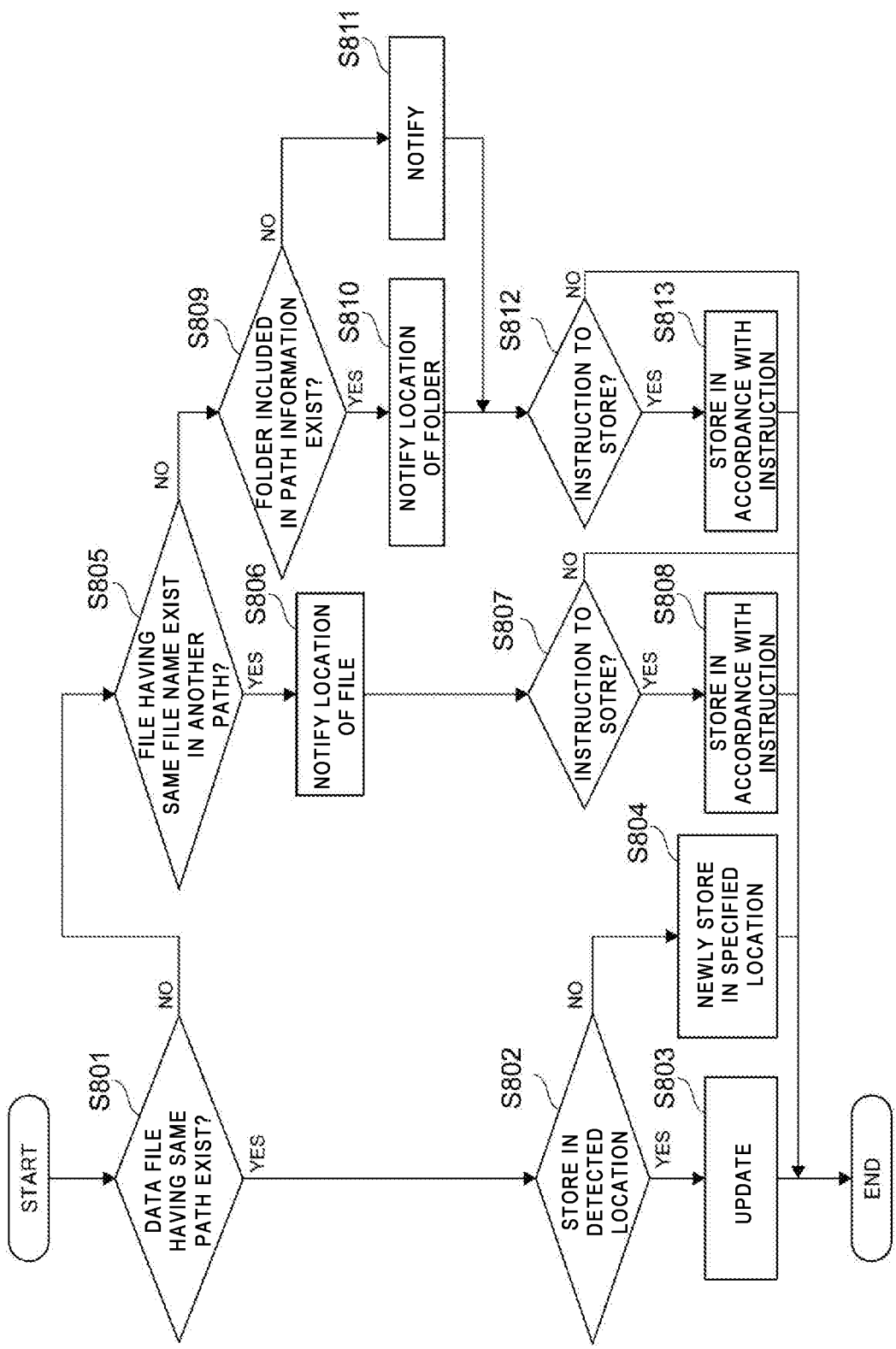
FIG. 8 is a flowchart showing still another example of the operation of the file management server in re-uploading.

FIG. 8 is a flowchart showing still another example of the operation of the file management server 100 in re-uploading. The operation shown in FIG. 8 is an operation in a case where information on the path in the file system (hereinafter referred to as "path information") is included in the specific information of the data file. The path information uniquely specifies a data file stored in a location specified by the path information. That is, not only the data file but also the folder that stores the data file and the upper-level folder of the folder are specified by the path information. In the example, it is assumed that plural files having the same file name cannot be stored in one folder, and that the data file is specified by a file name recorded in the path information. In this case, data files having the same file name may still exist in plural folders. However, since the folders in which the data files are stored are different, path information are different, and the data files can be identified.

The file management server 100 refers to the file information DB 300, and firstly, checks whether a data file specified by the path information of the specific information extracted from the data file to be uploaded exists in the file system. When a corresponding data file (that is, a data file having the same path as the path specified by the path information) exists (YES in S801), the file management server 100 queries whether the data file to be uploaded is stored in the location (that is, the folder) where the data file is detected, and waits for an instruction from the user. In this example, since the paths are the same, when the relevant data file is detected, the folder in which the data file is stored is also the folder specified by the path information.

When receiving an instruction to store a data file to be uploaded in the folder in which the data file is detected (YES in S802), the file management server 100 stores the data file in accordance with the instruction. In this case, since the data file having the same path information exists in the folder, the data file is updated (S803). On the other hand, when receiving an instruction to store the data file to be uploaded in a folder that is different from the folder in which the data file is detected (NO in S802), the file management server 100 stores the data file to be uploaded in the folder specified by the instruction. In this case, the data file to be uploaded is stored as a new data file (S804).

When no data file corresponding to the path information extracted from the data file to be uploaded exists on the file system (NO in S801), the file management server 100 checks whether a data file having the same file name in another path exists (S805). When the relevant data file exists (YES in S805), the file management server 100 notifies the user of the location of the detected data file (S806), and waits for an instruction. In this case, since the data file having the same file name exists in a path different from the path indicated by the path information extracted from the data file to be uploaded, there is a possibility that the data file has been moved to another folder after being downloaded. Therefore, the user may select whether to update the data file of the same file name detected or to newly store the data file in one of the other folders. Then, when receiving an instruction to store the data file from the user (YES in S807), the file management server 100 stores the data file in accordance with the instruction (S808). On the other hand, when receiving an instruction to cancel the re-uploading of the data file (NO in S807), the file management server 100 ends the process.

When there is no data file having the same file name in any of the paths (NO in S805), the file management server 100 checks whether a folder included in the path information extracted from the data file to be uploaded exists. When the relevant folder exists (YES in S809), the file management server 100 notifies the user of the location of the detected folder (S810), and waits for an instruction. Here, a folder to be searched for may be a folder included in the path information. The folder to be searched for is not limited to the folder in which the data file to be uploaded is stored, but may be an upper-level folder of the folder (excluding a root node). It is noted that the folder that the file management server 100 notifies its location is a folder at the lowest-level among the folders included in the path information. A hierarchy of folders to be searched may be determined in advance.

When there is no folder included in the path information extracted from the data file to be uploaded (NO in S809), this means that all paths shown in the path information have been deleted in the file system. In this case, the file management server 100 notifies the user of the fact (S811), and waits for an instruction.

When receiving an instruction to store the data file in one of folders after the notification in S810 or S811 (YES in S812), the file management server 100 stores the data file in the folder specified by the instruction (S813). In this case, the data file to be uploaded is stored as a new data file. On the other hand, when receiving an instruction to cancel the re-uploading of the data file (NO in S812), the file management server 100 ends the process.

The plural operation examples in re-uploading are shown in accordance with contents of specific information. The above operations are mere examples. The operation of the file management server 100 in re-uploading is not limited to the operations shown in the flowcharts. In a case where all of the file ID, the version information, and the folder ID is included in the specific information, the operation is a combination of the flowcharts in FIGS. 6 and 7. In a case where the path information is used as the specific information, the data file may be identified not based on the file name but based on the file ID added by the specific information addition function 112, and the specific information may include the file ID in addition to the path information. The version of the data file may be managed, and the specific information may include the version information in addition to the path information.

Configuration of Terminal Device 400

Figure 9:
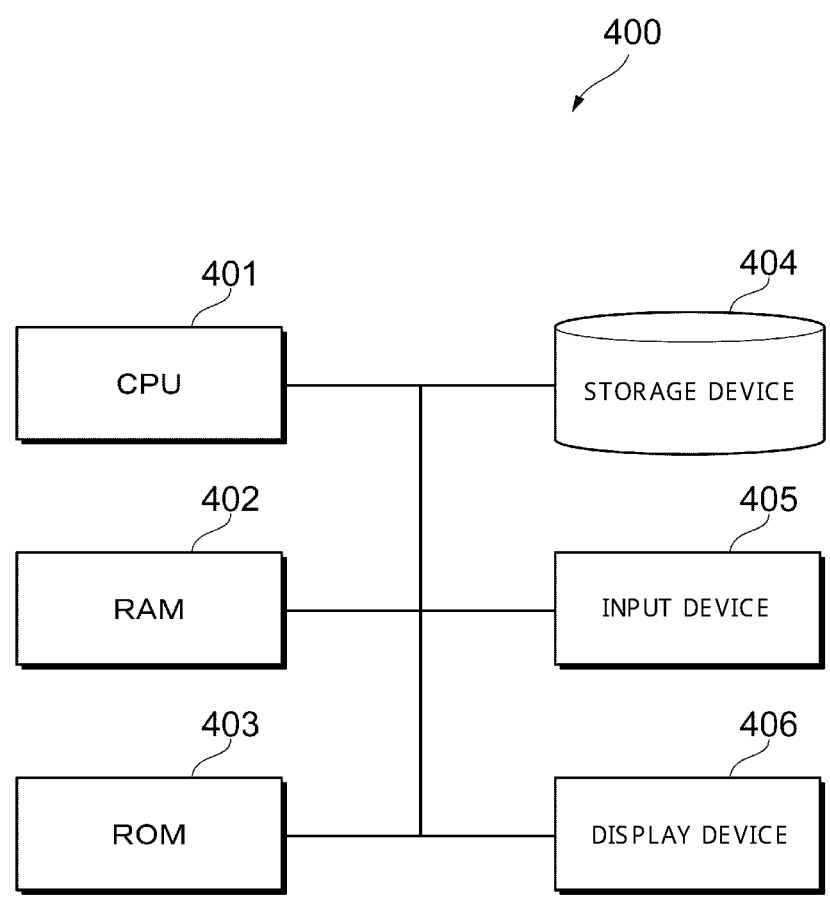
FIG. 9 is a diagram showing an example of a hardware configuration of a terminal device.

FIG. 9 is a diagram showing an example of a hardware configuration of the terminal device 400. The terminal device 400 is implemented by a computer. The computer that implements the terminal device 400 includes a central processing unit (CPU) 401 that is an arithmetic unit, and a random access memory (RAM) 402, a read only memory (ROM) 403, and a storage device 404 that serve as storages. The computer that implements the terminal device 400 further includes an input device 405 and a display device 406. The RAM 402 is a main storage device. The CPU 401 can read a program and data from the ROM 403 and execute the processing. The storage device 404 stores a program, and the CPU 401 reads the program stored in the storage device 404 into the main storage device and executes the program. Result of the processing by the CPU 401 is stored in the storage device 404. For example, a magnetic disk device, a solid state drive (SSD), or the like is used as the storage device 404.

The display device 406 is a device that displays a screen such as an operation screen and an information presentation screen. The display device 406 displays a UI screen acquired from the file management server 100. For example, a liquid crystal display is used as the display device 406. The input device 405 is a device that receives an input operation by the user. The input device 405 receives an operation that is performed by the user in accordance with the operation screen such as the UI screen displayed on the display device 406. For example, a device such as a keyboard and a mouse is used as the input device 405. A touch sensor may be used as the input device 405. A combination of the liquid crystal display serving as the display device 406 and the touch sensor may constitute a touch panel serving as the user interface.

Functions such as a function of exchanging data with the file management server 100 (for example, transmitting data files and specific information, and receiving information indicating whether a data file corresponding to the specific information exists in the file system and information on the storage location), a function of displaying the UI screen on the display device 406, and a function of receiving an operation of the UI screen and the input device 405 (for example, specifying the storage location and storage method of the data file) are implemented by the CPU 401 executing a program.

Configuration Example of UI Screen

Figure 10:
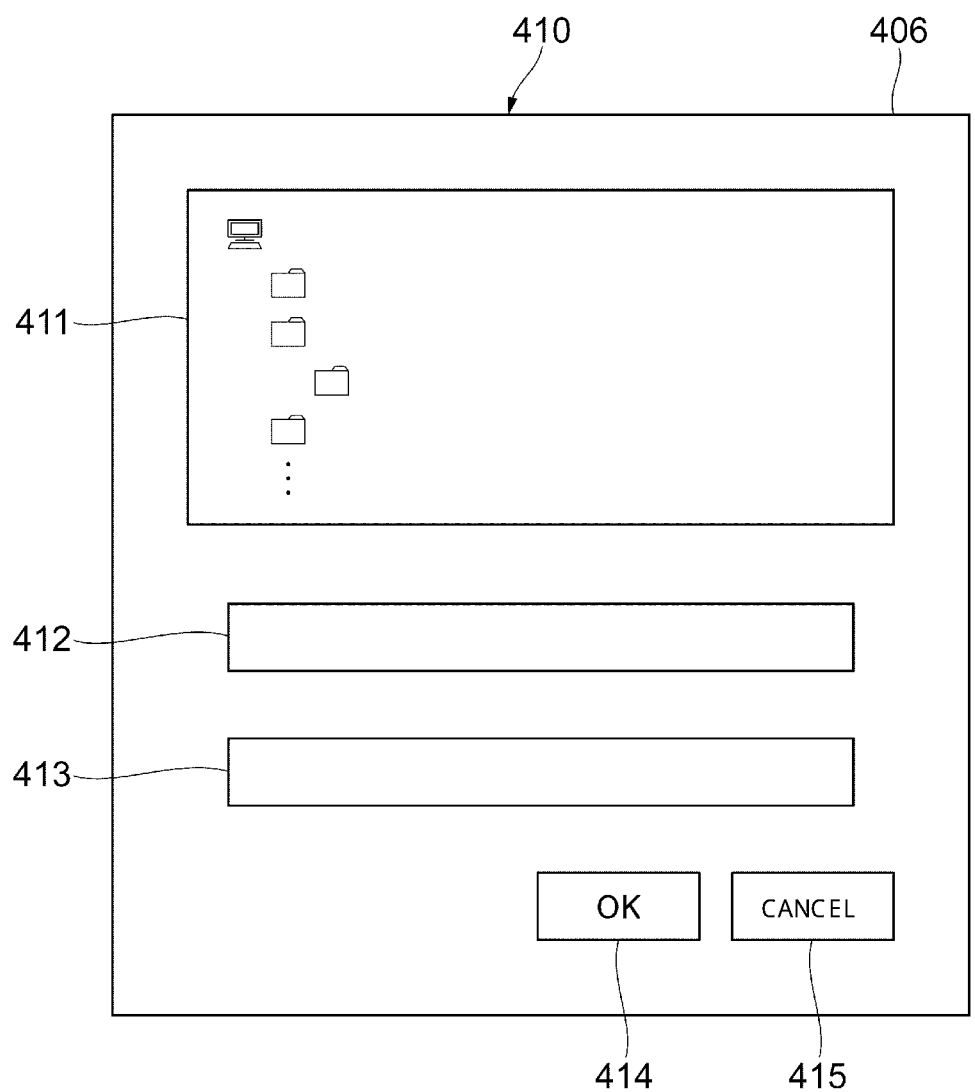
FIG. 10 is a diagram showing a configuration example of a UI screen displayed on a display device.

FIG. 10 is a diagram showing a configuration example of the UI screen displayed on the display device 406. The UI screen 410 shown in FIG. 10 includes a hierarchy display field 411, a message display field 412, an instruction input field 413, an OK button 414, and a cancel button 415. The folder structure (hierarchical structure) of the file system in the file management server 100 is displayed on the hierarchy display field 411. The folder structure displayed on the hierarchy display field 411 functions as a UI for specifying a folder. The user can specify a folder which is a storage destination of a data file by selecting the folder from the folder structure displayed on the hierarchy display field 411.

Displayed on the message display field 412 are (i) information to be notified to the user from the file management server 100 and (ii) a message that is a query to the user. The user inputs the instruction to the file management server 100 through the instruction input field 413. The OK button 414 is a button object for confirming an instruction input to the instruction input field 413 and transmitting the instruction to the file management server 100. The cancel button 415 is a button object for stopping an operation according to the displayed UI screen 410.

In the operation shown in FIG. 5, when the determination in S501 is YES, and the file management server 100 queries whether to store the data file to be uploaded, a tree diagram showing the detected folder in the folder structure, for example, is displayed on the hierarchy display field 411 on the UI screen 410. For example, when a data file having the same file ID as that of the data file to be uploaded exists, a message such as "Do you want to update the file?" is displayed on the message display field 412. When no data file having the same file ID as that of the data file to be uploaded exists, a message such as "Do you want to store the file" is displayed. The user inputs the location of the folder which is the storage destination on the file system in the instruction input field 413, and operates the OK button 414 to store the data file.

When the notification is performed in S505, for example, a message such as "Do you want to store the file?" is displayed on the message display field 412 on the UI screen 410. When storing the data file, the user inputs the location of the folder which is the storage destination on the file system in the instruction input field 413, and operates the OK button 414 to store the data file. On the other hand, when the storing of the data file is stopped, the user operates the cancel button 415 to end the process.

In the operation shown in FIG. 6, when the notification is performed in S606, for example, a message such as "Not the latest version" is displayed on the message display field 412 on the UI screen 410. Displayed on the instruction input field 413 is also information (for example, a combination of a check box and a message relating to a selectable option) for receiving a selection as to whether to store the data file in same folder as the latest version of the same data file or to newly store the data file as another data file. When storing the data file, the user selects one of the storage methods and operates the OK button 414 to store the data file. At this time, when the user selects to newly store the data file, a message requesting the user to specify a storage destination is further displayed on the message display field 412. Then, the user inputs the location of the folder which is the storage destination on the file system, and operates the OK button 414. On the other hand, when the storing of the data file is stopped, the user operates the cancel button 415 to end the process.

In the operation shown in FIG. 7, when the notification is performed in S706, the location of the folder in which the data file is detected is displayed on the hierarchy display field 411 of the UI screen 410, while a message such as "the folder is already moved" is displayed on the message display field 412 of the UI screen 410, so as to notify that the folder is different. Displayed on the message display field 412 is also information (for example, a combination of a check box and a message relating to a selectable option) for receiving a selection as to whether to update the data file in the folder which is the move destination or to newly store the data file as another data file. When storing the data file, the user selects one of the storage methods and operates the OK button 414 to store the data file. At the time, when the user selects to newly store the data file, a message is displayed on the message display field 412 to request the user to select whether to store the data file in a folder (before moved) which is the download source or to store the data file in another folder. The user inputs the location of the folder which is the storage destination on the file system, and operates the OK button 414. On the other hand, when the storing of the data file is stopped, the user operates the cancel button 415 to end the process.

When the notification is performed in S710, the detected location of the folder is displayed on the hierarchy display field 411 of the UI screen 410, while a message such as "Do you want to store the file?" is displayed on the message display field 412 of the UI screen 410. On the other hand, when the notification is performed in S711, the location of the folder is not shown, and a message such as "No relevant folder exists. Do you want to store the file?" is displayed on the message display field 412. When storing the data file, the user inputs the location of the folder which is the storage destination on the file system, and operates the OK button 414. On the other hand, when the storing of the data file is stopped, the user operates the cancel button 415 to end the process.

In the operation shown in FIG. 8, when the notification is performed in S806, the path of the target data file is displayed on the hierarchy display field 411 of the UI screen 410, while a message such as "the folder is moved" is displayed on the message display field 412 of the UI screen 410, so as to notify that the path is different. Displayed on the message display field 412 is also information (for example, a combination of a check box and a message relating to a selectable option) for receiving a selection as to whether to update the data file in the path which is the move destination or to newly store the data file as another data file. When storing the data file, the user selects one of the storage methods and operates the OK button 414 to store the data file. At this time, when the user selects to newly store the data file, a message is displayed on the message display field 412 to request the user to select whether to store the data file in a path (before moved) which is the download source or to store the data file in another path. The user inputs the path of the storage destination and operates the OK button 414. On the other hand, when the storing of the data file is stopped, the user operates the cancel button 415 to end the process.

When the notification is performed in S810, the detected path is displayed on the hierarchy display field 411 of the UI screen 410, while a message such as "Do you want to store the file?" is displayed on the message display field 412 of the UI screen 410. On the other hand, when the notification is performed in S811, the path is not shown, and a message such as "No relevant path exists. Do you want to store the file?" is displayed on the message display field 412. When storing the data file, the user inputs the path which is the storage destination, and operates the OK button 414. On the other hand, when the storing of the data file is stopped, the user operates the cancel button 415 to end the process.

Figure 11:
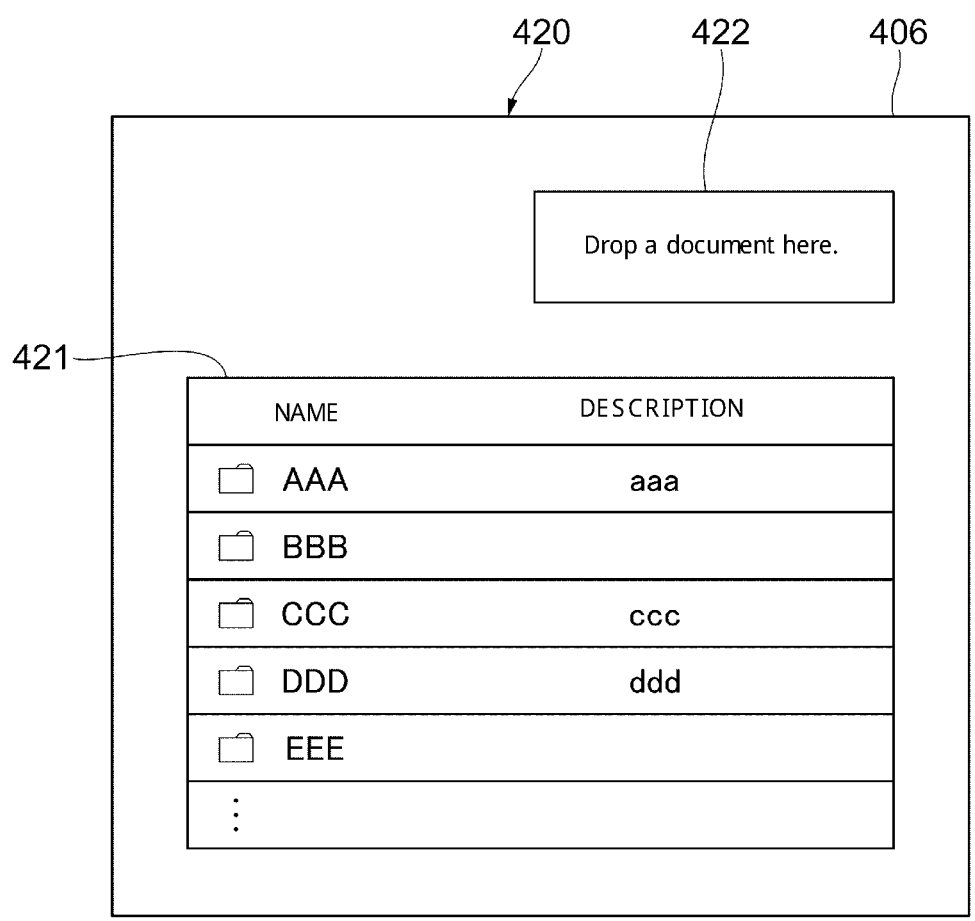
FIG. 11 is a diagram showing another configuration example of the UI screen displayed on the display device.

FIG. 11 is a diagram showing a configuration example of another UI screen displayed on the display device 406. A UI screen 420 shown in FIG. 11 includes a folder display field 421 and an upload area 422. The UI screen 420 shown in FIG. 11 is an example of an initially displayed screen in uploading (or re-uploading) a data file. When a data file is uploaded (or re-uploaded), for example, first, the UI screen 420 in FIG. 11 is displayed on the display device 406, and an operation of uploading (or re-uploading) the data file is received. Then, when the specific information is extracted from the data file to be uploaded and the management state of the data file is checked as shown in S406 in FIG. 4, the UI screen 410 of FIG. 10 is displayed, and a mode of uploading the data file is specified.

In the UI screen 420 shown in FIG. 11, a folder group constituting the file system on the file management server 100 is displayed on the folder display field 421. The folders displayed on the folder display field 421 may simply be folders that satisfy a specific display condition, or may be folders constituting the hierarchical structure of the file system, like the hierarchy display field 411 of the UI screen 410 in FIG. 10. Examples of the display condition include various conditions used in a display method of an existing file system such as folders from the root to a certain level on a file system or folders that are frequently used. Names of folders and texts describing the folders are displayed on the folder display field 421 shown in FIG. 11. It is noted that the specific display method of the folders is not particularly limited.

The upload area 422 is an operation unit that receives an operation of uploading a data file with a graphical user interface (GUI). Specifically, the user moves an icon of a data file to be uploaded to the upload area 422 by a drag-and-drop operation on the screen of the display device 406. When this operation is performed, a data file associated with the operated icon and an upload request for the data file are transmitted from the terminal device 400 to the file management server 100.

The exemplary embodiment of the present disclosure is described above. It is noted that the technical scope of the present disclosure is not limited to the above exemplary embodiment. For example, described in the above exemplary embodiment is the configuration in which the functions of the file management server 100 are implemented by one server. Alternatively, the functions of the file management server 100 may be distributed among plural servers on the network (that is, a so-called cloud server).

The file ID added by the file management server 100 is used as the identification information of the data file in the above exemplary embodiment. When even data files having the same file name can be identified using a combination of the file name and folders which are storage locations or when it is possible to restrict data files such that same file names do not exist, a file name added to a data file by the user may be used as the identification information of the data file.

In the above exemplary embodiment, when the data file is re-uploaded, the data file to which the specific information is added is sent to the file management server 100, and the file management server 100 extracts the specific information and checks the management state of the data file. Alternatively, the terminal device 400 may extract the specific information from the data file and send the specific information to the file management server 100 prior to the re-uploading of the data file, the file management server 100 may check the management state of the data file based on the received specification information, and then the upload of the data file may be received.

In the above-described exemplary embodiment, the file management server 100 determines whether the specific information is added to the uploaded data file and checks the management state of the data file when the specific information is added (in the case of the re-uploading). On the other hand, when the user specifies the storage location of the data file and the re-upload is performed, the file management server 100 may not check the management state of the data file, but store the data file in the specified storage location. In this case, only when the storage location of the data file is not specified and the re-upload is performed, the file management server 100 checks the management state of the data file.

In the above-described exemplary embodiment, whether the upload is the first upload or the re-upload is identified based on whether the specific information is added to the uploaded data file. On the other hand, when the user specifies the storage location and the data file is uploaded, the data file may be identified as first uploaded, and when the data file is uploaded without the user specifying the storage location, the data file may be identified as re-uploaded. In this case, a file that is uploaded without the user specifying a storage location may actually be a data file to be newly managed (that is, the specific information is not yet added and the specific information cannot be extracted). In such a case, a message requesting the user to specify a storage location may be displayed on the message display field 412, and the user may specify a folder from the hierarchy display field 411. Various changes and substitutions of configurations that do not depart from the scope of the technical idea of the present disclosure are also covered by the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A file management device comprising:
a processor configured to:
add specific information to a file to be managed, the specific information identifying a storage location including a folder on the file system from which the file has been downloaded to an outside of the file system; and
upon receiving a request, from an external device, to re-upload the file into the file system:
acquire the specific information added to the file,
specify the storage location on the file system based on the specific information,
determine whether the folder identified in the specific information is same as a folder detected on the file system for storing a file having a same file ID as the file, and
upon determining that the folder identified in the specific information is not the same as the folder storing the file having the same file ID, cause a user-interface to be displayed on the external device, the displayed user-interface indicating a detected storage location corresponding to the folder storing the file having the same file ID, and including a message indicating that the folder storing the file having the same file ID is different from the folder identified in the specific information.

2. The file management device according to claim 1, wherein
the file to be managed includes files to be managed,
the specific information of each file to be managed includes identification information capable of identifying the file to be managed, and
when a file having the same identification information as that of a file to be uploaded exists in the file system, the processor specifies a location where the file having the same identification information exists.

3. The file management device according to claim 2, wherein
the specific information further includes version information indicating different versions of the plurality of files to which the same identification information is added, and
if a file having the same identification information as that of the file to be uploaded exists in the file system and the version information of the file to be uploaded is the same as the latest version information of the file having the same identification information, the processor updates the version information of the file to be uploaded when storing the file to be uploaded in a location where the file having the same identification information exists.

4. The file management device according to claim 2, wherein
the specific information further includes version information indicating different versions of the plurality of files to which the same identification information is added, and
when the file having the same identification information as that of the file to be uploaded exists in the file system and the version information of the file to be uploaded is not the same as the latest version information of the file having the same identification information, the processor outputs information to that effect.

5. The file management device according to claim 2, wherein the specific information includes location identification information capable of identifying a location where the file to be uploaded is stored before being downloaded.

6. The file management device according to claim 1, wherein
the specific information includes path information indicating a path to a location on the file system from which the file to be managed has been downloaded to the outside of the file system, and
when the path indicated by the path information does not exist in the file system, the processor outputs information to that effect.

7. The file management device according to claim 6, wherein when the path indicated by the path information does not exist in the file system and an upper-level part of the path still exists in the file system, the processor outputs information on the upper-level part of the path.

8. The file management device according to claim 1, wherein the processor is configured to receive specification of a storage method in re-uploading the file to the file system.

9. The file management device according to claim 8, wherein
the file to be managed includes files to be managed by the file system,
the specific information of each file to be managed includes identification information capable of identifying the file to be managed, and
the specific information further includes version information indicating different versions of the plurality of files to which the same identification information is added,
when a file having the same identification information as that of the file downloaded from the file system exists in the file system and the version information of the file downloaded from the file system is not the same as the latest version information of the file having the same identification information, the processor
outputs information to that effect, and receives, as the storage method, specification of any one of (i) a method of updating the version information of the file downloaded from the file system and storing the updated version information, and (ii) a method of adding new identification information to the file downloaded from the file system and storing the file as another file.

10. The file management device according to claim 8, wherein
when the processor receives the request to re-upload the file from the external device together with specification of a storage location, the processor automatically sets the specified storage location to as the storage location of the file, and
when the processor receives the request to re-upload the file from the external device without the specification of the storage location, the processor acquires the specific information from the file and specify the storage location based on the specific information.

11. The file management device according to claim 1, wherein
the displayed user-interface indicates the detected storage location in a tree diagram showing the folder storing the file having the same file ID and an upper-level folder in a hierarchy of folders in the file system.

12. The file management device according to claim 11, wherein
the processor receives, from the external device, a user-selected folder in the displayed tree diagram and sets the user-selected folder as a storage destination of the file in re-uploading the file to the file system.

13. The file management device according to claim 12, wherein
the displayed user-interface further includes an input field to specify a storage method for re-uploading the file into the file system.

14. The file management device according to claim 13, wherein
the displayed user-interface concurrently displays (i) the tree diagram with the folder storing the file having the same file ID being highlighted, (ii) the message indicating that the folder storing the file having the same file ID is different from the folder identified in the specific information, and (iii) the input field for specifying the storage method.

15. The file management device according to claim 1, wherein the processor is further configured to
upon determining that the folder identified in the specific information is the same as the folder storing the file having the same file ID, store the file in the folder identified in the specific information.

16. A non-transitory computer readable medium storing a program that causes a computer to execute file management processing, the file management processing comprising:
transmitting specific information to a server configured to manage files with a file system, the specific information being recorded in a file downloaded from the file system, the specific information specifying a storage location including a folder from which the file is downloaded from the file system;
upon receiving a request, from an external device, to re-upload the file into the file system:
receiving, from the server, information indicating (i) presence or absence of a file having a same file ID as the file in the file system and (ii) a detected storage location on the file system for the file having the same file ID as the file;
when the file having the same file ID exits in the file system,
determining whether the folder identified in the specific information of the file is same as a folder detected on the file system for storing the file having the same file ID;
upon determining that the folder identified in the specific information is not the same as the folder storing the file having the same file ID, causing a user-interface to be displayed on the external device, the displayed user-interface indicating the detected storage location corresponding to the folder storing the file having the same file ID, and including a message indicating that the folder storing the file having the same file ID is different from the folder identified in the specific information;
receiving, from the external device, specification of a storage method in re-uploading the file to the file system; and
re-uploading the file to the file system according to the specified storage method.

17. A non-transitory computer readable medium storing a program that causes a computer to execute file management processing, the file management processing comprising:
adding specific information to a file to be managed, the specific information identifying a storage location including a folder on the file system from which the file has been downloaded to an outside of the file system; and
upon receiving a request, from an external device, to re-upload the file into the file system:
acquiring the specific information added to the file,
specifying the storage location on the file system based on the specific information,
determining whether the folder identified in the specific information is same as a folder detected on the file system for storing a file having a same file ID as the file, and
upon determining that the folder identified in the storage location of the specific information is not the same as the folder storing the file having the same file ID, causing a user-interface to be displayed on the external device, the displayed user-interface indicating a detected storage location corresponding to the folder storing the file having the same file ID, and including a message indicating that the folder storing the file having the same file ID is different from the folder identified in the specific information.

* * * * *